(12) United States Patent
Fahie et al.

(10) Patent No.: US 8,632,103 B2
(45) Date of Patent: Jan. 21, 2014

(54) LOCK FOR CAM-AND-GROOVE COUPLER

(75) Inventors: Paul Brian Fahie, Halifax (CA); Blair John Pike, Harbour Grace (CA); Michael Stanley Parsons, Clarenville (CA); Paul Maxwell Smith, Spaniard's Bay (CA); Scott Maxwell Pike, Harbour Grace (CA)

(73) Assignee: Parrish Enterprises, Ltd., Enid, OK (US)

( * ) Notice: Subject to any disclaimer, the term of this patent is extended or adjusted under 35 U.S.C. 154(b) by 24 days.

(21) Appl. No.: 12/745,740

(22) PCT Filed: Dec. 4, 2008

(86) PCT No.: PCT/CA2008/002117
§ 371 (c)(1),
(2), (4) Date: Aug. 31, 2010

(87) PCT Pub. No.: WO2009/070880
PCT Pub. Date: Jun. 11, 2009

(65) Prior Publication Data
US 2010/0314868 A1   Dec. 16, 2010

Related U.S. Application Data

(60) Provisional application No. 61/089,652, filed on Aug. 18, 2008.

(30) Foreign Application Priority Data

Dec. 5, 2007   (CA) ..................................... 2615184

(51) Int. Cl.
*F16L 35/00*   (2006.01)

(52) U.S. Cl.
USPC ................................ 285/80; 285/312; 70/158

(58) Field of Classification Search
USPC ........... 70/158, 159, 174–180, 232, 209–212, 70/333 R, 445, 192–197, 163, 164, 166; 285/1, 80, 86, 87, 312, 365, 373, 420
See application file for complete search history.

(56) References Cited

U.S. PATENT DOCUMENTS

| 804,387 | A | * | 11/1905 | Davis ............................... 70/57 |
| 3,439,942 | A |   | 4/1969 | Moore et al. |

(Continued)

FOREIGN PATENT DOCUMENTS

| CA | 2297435 | 3/1984 |
| CA | 1166468 | 5/1984 |

(Continued)

OTHER PUBLICATIONS

Written Opinion. PCT Application No. PCT/CA2008/002117. Dated Mar. 11, 2009.

(Continued)

*Primary Examiner* — James Hewitt
*Assistant Examiner* — Jay R Ripley
(74) *Attorney, Agent, or Firm* — Bereskin & Parr LLP/S.E.N.C.R.L., s.r.l.

(57) ABSTRACT

A lock for a cam-and-groove coupler comprises a collar member positionable around the cam-and-groove coupler. The collar member comprises at least first and second wall portions. The first wall portion is positionable adjacent the first lever arm of the cam-and-groove coupler to prevent movement of the first lever arm to an unsecured position. The second wall portion is positionable adjacent a second lever arm of the cam-and-groove coupler to prevent movement of the second lever arm to the unsecured position. The lock further comprises at least one projection extending inwardly from the collar member and configured to engage the cam-and-groove coupler to prevent the collar member from sliding off of the cam-and-groove coupler. At least one securing member is coupled to the collar member and configured to releasably secure the collar member around the cam-and-groove-coupler.

19 Claims, 10 Drawing Sheets

(56) References Cited

U.S. PATENT DOCUMENTS

| | | |
|---|---|---|
| 3,477,607 A | 11/1969 | Fuzzell et al. |
| 3,722,549 A | 3/1973 | Wilson et al. |
| 3,756,047 A | 9/1973 | Mulberry |
| 3,950,971 A | 4/1976 | Karls |
| 4,073,168 A | 2/1978 | Takada |
| 4,351,446 A | 9/1982 | Madden |
| 4,802,694 A | 2/1989 | Vargo |
| 4,803,858 A | 2/1989 | Parker |
| 4,881,597 A | 11/1989 | Hensley |
| 5,092,359 A * | 3/1992 | Wirth et al. .................. 137/382 |
| 5,462,316 A | 10/1995 | Street et al. |
| 5,638,977 A | 6/1997 | Bianchi |
| 6,206,431 B1 | 3/2001 | Street |
| 6,508,274 B2 | 1/2003 | Street |
| 6,779,943 B2 * | 8/2004 | Shoen ........................... 403/344 |
| 6,883,546 B1 | 4/2005 | Kobylinski |
| 7,523,963 B2 * | 4/2009 | Draper et al. ................... 285/88 |

FOREIGN PATENT DOCUMENTS

| | | |
|---|---|---|
| CA | 2299158 | 2/1999 |
| CA | 2062131 | 11/2000 |
| CA | 1164679 | 12/2006 |

OTHER PUBLICATIONS

International Search Report. PCT Application No. PCT/CA2008/002117. Dated Mar. 11, 2009.

Fittings, Inc. Webpage. http://www.fittingsinc.com/hose_ends_couplings.html. Accessed Feb. 18, 2008.

* cited by examiner

LOCK FOR CAM-AND-GROOVE COUPLER

CROSS-REFERENCE TO RELATED APPLICATIONS

This application is a national phase entry application of PCT application PCT/CA2008/002117 (filed on Dec. 4, 2008), which claims priority from Canadian patent application 2,615,184 (filed on Dec. 5, 2007), and U.S. provisional application 61/089,652 (filed on Aug. 18, 2008).

FIELD

The invention generally relates to a lock for a cam-and-groove coupler. Specifically, the invention relates to a lock which prevents the releasing of the lever arms of the cam-and-groove coupler and avoids fluid spillage, tampering, and/or contamination.

BACKGROUND

Cam-and-groove couplers are used to connect and disconnect hoses or conduits. An example of a cam-and-groove coupler 100 is shown in FIGS. 1A-1D.

The cam-and-groove coupler 100 includes a male piece 102, which is insertable into a female piece 104 to releasably and sealingly connect the male piece and the female piece. Accordingly, if the male 102 and female 104 pieces are coupled to hoses or conduits, the hoses or conduits may be releasably and sealingly connected via the cam-and-groove coupler.

Each of the male 102 and female 104 pieces have a body portion 106, 108. Each of the body portions 106, 108 include a longitudinally extending bore 110, 112 defined therethrough. When the male 102 and female 104 pieces are secured together, the bores 110, 112 are in fluid communication with each other.

Each of the body portions 106, 108 further comprise a first end 114, 116 that is configured to receive a hose or conduit, such that the hose or conduit is in fluid communication with each of the bores 110, 112. For example, the ends 114, 116 can each be threadedly secured to a hose or conduit.

A second end 118 of the body portion 106 of the male piece 102 and a second end 120 of the body portion 108 of the female piece 104 are mateable together to releasably and sealingly secure the male 102 and female 104 pieces together. The second end 118 of the male piece 102 is insertable into the second end 120 of the female piece 104, and comprises a rounded groove 122 extending around the circumference of the body portion 106 of the male piece 102. The female piece 104 includes a first 124a and second 124b cam which are positioned on circumferentially opposed sides of the body portion 108 of the female piece 104. The cams 124a, 124b are connected to and actuated by first 126a and second 126b levers, respectively, which rotate about pivot pins 127a, 127b.

The levers 126a, 126b each have an unsecured position, and a secured position. In the unsecured position, the levers 126a, 126b are positioned to extend generally transversely outwardly from the body portion 108 of the female piece 104, as shown in FIG. 1C. When the levers 126a, 126b are in the unsecured position, the cams 124a, 124b do not engage the groove 122, and the male piece 102 and the female piece 104 are not secured to each other. In the secured position, the levers 126a, 126b are positioned to extend generally along the body portion 108 of the female piece 104, for example generally parallel to the longitudinal bore 112. When the levers 126a, 126b are in the secured position, the cams 124a 124b are rotated to a position whereby they are inserted in the groove 122, as shown in FIG. 1D. Accordingly, the cams 124a, 124b engage the groove 122 to secure the male piece 102 and the female piece 104 together.

U.S. Pat. No. 3,439,942 to Moore discloses a retainer means for holding a lever arm of a cam-and-groove coupler. The retainer means includes a thin flat flexible resilient member including a planar first portion having an aperture therein receiving a pin that pivots the lever arm. The retaining means has a resilient second portion normally bent at an angle to the plane of the first portion and overlying and contacting the lever arm and holding it in place.

U.S. Pat. No. 6,206,431 discloses a safety assembly for a cam-and-groove coupler in which pull rings on the female unit serve to both release the coupling assembly and to maintain the coupling assembly locked against unintentional disconnection. In the locked conditions, the pull rings abut against ears on the housing of the female coupling unit to oppose unintended movement of the cam arms from the locked position of the cam arms to the released position of the cam arms. Upon intentional removal of the pull rings from abutment with the ears by an operator and pulling on the pull rings, the cam arms can be moved from the locked position of the cam arms to the released position of the cam arms to disconnect the coupling assembly.

SUMMARY

The following summary is provided to introduce the reader to the more detailed discussion to follow. The summary is not intended to limit the invention.

Cam-and-groove couplers generally provide a secure connection between hoses or conduits, provided that the lever arms of the coupler remain in place in the secured position. However, the lever arms of cam-and-groove couplers are susceptible to being released at unwanted times. For example, as the lever arms protrude outwards from the body portions, they can be inadvertently moved to the unsecured position if the coupler is dragged over a rough surface. Furthermore, the lever arms are generally relatively easy for an unauthorized user to release in order to tamper with the coupler.

If the cam-and-groove coupler is released at an unwanted time, either accidentally or by tampering, stored fluids can leak, and can cause environmental hazards and health hazards. Furthermore, the stored fluids can be stolen, resulting in monetary loss.

Embodiments of the present invention provide a lock for a cam-and-groove coupler which prevents the cam-and-groove coupler from being released at unwanted times. The lock prevents both accidental releasing of the cam-and-groove coupler, and releasing of the cam-and-groove coupler by an unauthorized user.

According to a first broad aspect, the lock comprises a collar member positionable around the cam-and-groove coupler. The collar member comprises at least first and second wall portions. The first wall portion is positionable adjacent the first lever arm of a cam-and-groove coupler to prevent movement of the first lever arm to the unsecured position when the collar member is positioned around the cam-and-groove coupler and when the first lever arm is in the secured position. The second wall portion is positionable adjacent the second lever arm of the cam-and-groove coupler to prevent movement of the second lever arm to the unsecured position when the collar member is positioned around the cam-and-groove coupler and when the second lever arm is in the secured position. The lock further comprises at least one projection extending inwardly from the collar member and configured to engage the cam-and-groove coupler when the collar member is positioned around the cam-and-groove coupler to prevent the collar member from sliding off of the cam-and-groove coupler. At least one securing member is coupled to the collar member and configured to releasably secure the collar member around the cam-and-groove-coupler.

Embodiments in accordance with this broad aspect may be advantageous because the lock may prevent both accidental releasing of the cam-and-groove coupler, as well as tampering with the cam-and-groove coupler. That is, if the lever arms of the cam-and-groove coupler are accidentally rotated from the secured position, the lever arms will contact the first and second wall portions, and any further movement will be prevented. In addition, if an unauthorized user attempts to access the lever arms of the cam-and-groove coupler, for example to tamper with the cam-and-groove coupler, the first and second wall portions will prevent the user from moving the lever arms. Furthermore, the securing member prevents the lock from being removed from the cam-and-groove coupler, either accidentally or by an unauthorized user, and the projection prevents the lock from sliding off of the cam-and-groove coupler, either accidentally or by an unauthorized user.

In some embodiments, the first and second wall portions each comprise a central wall, and first and second transverse walls extending from the central wall.

In some embodiments, the collar member further comprises third and fourth wall portion, and the first, second, third, and fourth wall portions define a lumen when the collar member is positioned around the cam-and-groove coupler. The lumen comprises a first portion sized to receive a first lever arm of the cam and groove coupler, a second portion sized to receive a second lever arm of the cam-and-groove coupler, and a third portion sized to receive body portions of the cam-and-groove-coupler.

In some embodiments, the first and second portions project from opposed sides of the third portion.

In some embodiments, the first wall portion defines the first lumen portion, the second wall portion defines the second lumen portion, and third and fourth wall portions extend between the first and second wall portions and define the third lumen portion.

In some embodiments, the wall portions are defined by first and second wall members each having first and second ends, and the first and second wall members are pivotably connected at the first ends thereof such that the collar member is movable between an open configuration and a closed configuration. Such embodiments may be advantageous because the lock may be easily positioned around and removed from the cam-and-groove coupler by authorized users.

In some embodiments, the first wall member comprises a first half of the first wall portion, a first half of the second wall portion, and the third wall portion, and the second wall member comprises a second half of the first wall portion, a second half of the second wall portion, and the fourth wall portion.

In some embodiments the first and second wall members are connected via a hinge comprising a hinge pin, the hinge pin has a first end and a second end opposed from the first end, and the first end and the second end each comprise a flange preventing removal of the hinge pin from the hinge. Such embodiments may be advantageous because the flanges may prevent an unauthorized user from tampering with the hinge to access the coupler.

In some embodiments the securing member comprises a first tab and a second tab extending from the second end of the first wall member, and a third tab extending from the second end of the second wall member. The first, second, and third tabs each comprise an aperture, and the apertures are alignable to receive a locking fastener when the collar member is positioned around the cam-and-groove coupler. Such embodiments may be advantageous because the locking fastener may allow the lock to be selectively locked and unlocked.

In some embodiments, the lock is fabricated from one or more of a metal, a metal alloy, or a plastic.

In some embodiments, the least one projection comprises at least one flange extending inwardly from the collar member and being positionable between a rib of a male end of the cam-and-groove coupler and a lip of a female end of the cam-and-groove coupler.

In some embodiments, the at least one projection comprises a first flange extending inwardly from the third wall portion, and a second flange extending inwardly from the fourth wall portion.

In some embodiments the first wall portion further prevents access to a pivot pin of the first lever arm when the collar member is positioned around the cam-and-groove coupler and when the first lever arm is in the secured position; and the second wall portion further prevents access to a pivot pin of the second lever arm when the collar member is positioned around the cam-and-groove coupler and when the second lever arm is in the secured position. Such embodiments may be advantageous because an unauthorized user may be prevented from tampering with the pivot pin to access the cam-and-groove coupler.

In some such embodiments the pivot pin of the first lever arm is positioned between a first end and a second end of the first wall portion when the collar member is positioned around the cam-and-groove coupler and when the first lever arm is in the secured position; and the pivot pin of the second lever arm is positioned between the first end and the second end of the second wall portion when the collar member is positioned around the cam-and-groove coupler and when the first lever arm is in the secured position.

According to a second broad aspect, the lock comprises a collar member positionable around a cam-and-groove coupler and being movable between an open configuration and a closed configuration. The collar member comprises a plurality of wall portions, and the wall portions define a lumen when the collar member in the closed configuration. The lumen comprises a first portion sized to receive a first lever arm of the cam and groove coupler, a second portion sized to receive a second lever arm of the cam-and-groove coupler, and a third portion sized to receive a body of the cam-and-groove-coupler. The wall portions are configured to prevent releasing of the first and second lever arms when the collar member is positioned around the cam-and-groove coupler and in the closed configuration. At least one projection extends inwardly from at least one of the wall portions to engage the cam-and-groove coupler to prevent the collar member from sliding off of the cam-and-groove coupler when the collar is in the closed configuration and positioned around the cam-and-groove coupler. A securing member is coupled to the collar member and is configured to releasably secure the collar member in the closed configuration.

According to a third broad aspect, the lock comprises a collar member positionable around the cam-and-groove coupler. The collar member comprises at least first and second wall portions. The first wall portion is positionable adjacent the first lever arm of a cam-and-groove coupler to prevent movement of the first-lever arm to the unsecured position when the collar member is positioned around the cam-and-groove coupler and when the first lever arm is in the secured position. The second wall portion is positionable adjacent the second lever arm of the cam-and-groove coupler to prevent movement of the second lever arm to the unsecured position when the collar member is positioned around the cam-and-groove coupler and when the second lever arm is in the secured position. The lock further comprises at least one projection positionable to extend inwardly from the collar member and configured to engage the cam-and-groove coupler when the collar member is positioned around the cam-and-groove coupler to prevent the collar member from sliding off of the cam-and-groove coupler.

BRIEF DESCRIPTION OF THE DRAWINGS

The present invention will be more fully and particularly understood in connection with the following description of certain embodiments of the invention in which.

DETAILED DESCRIPTION

Figure 1A:
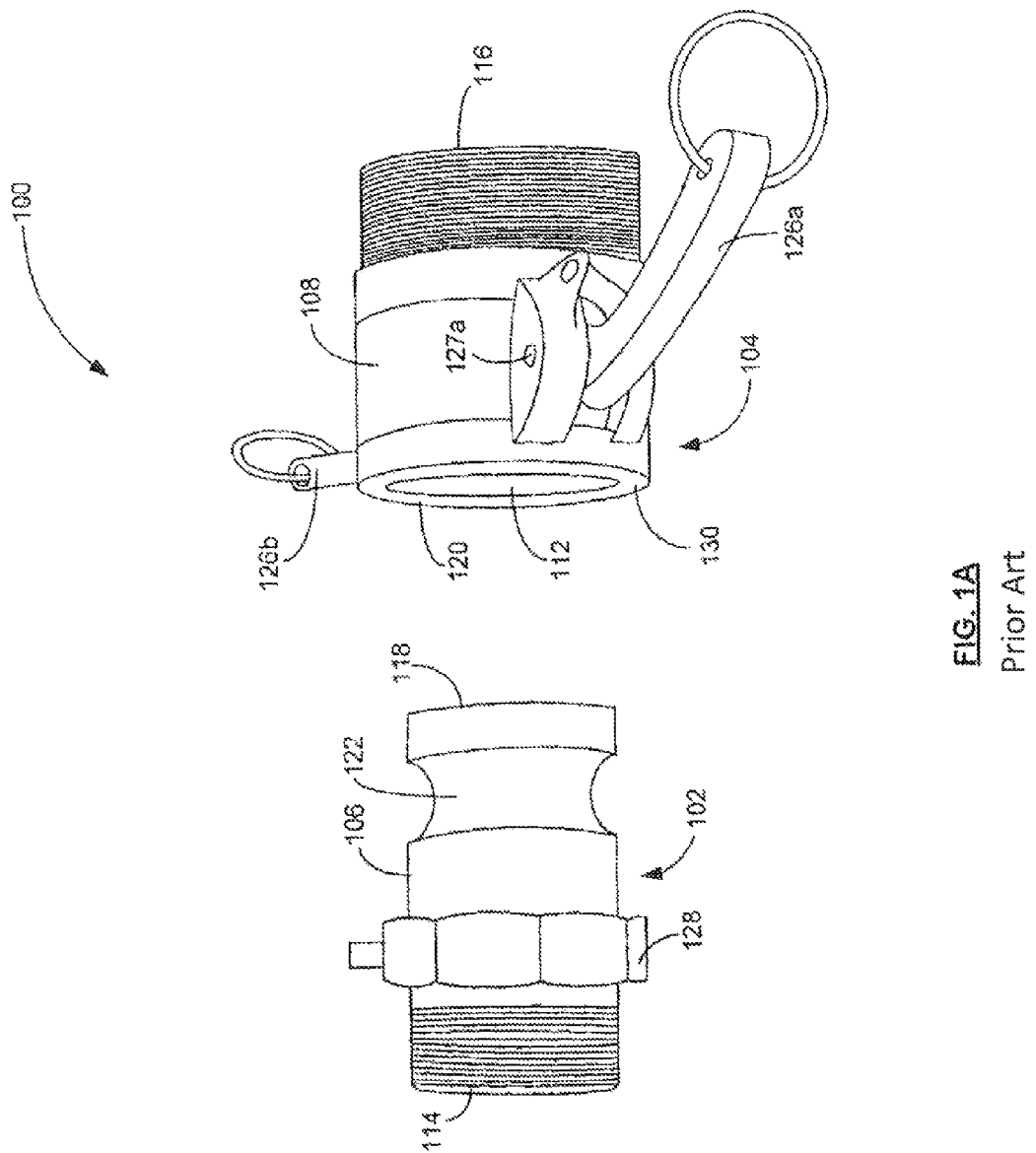
FIG. 1A is a perspective illustration of a known cam-and-groove coupler, showing the male piece and the female piece separated from each other.
Figure 1B:
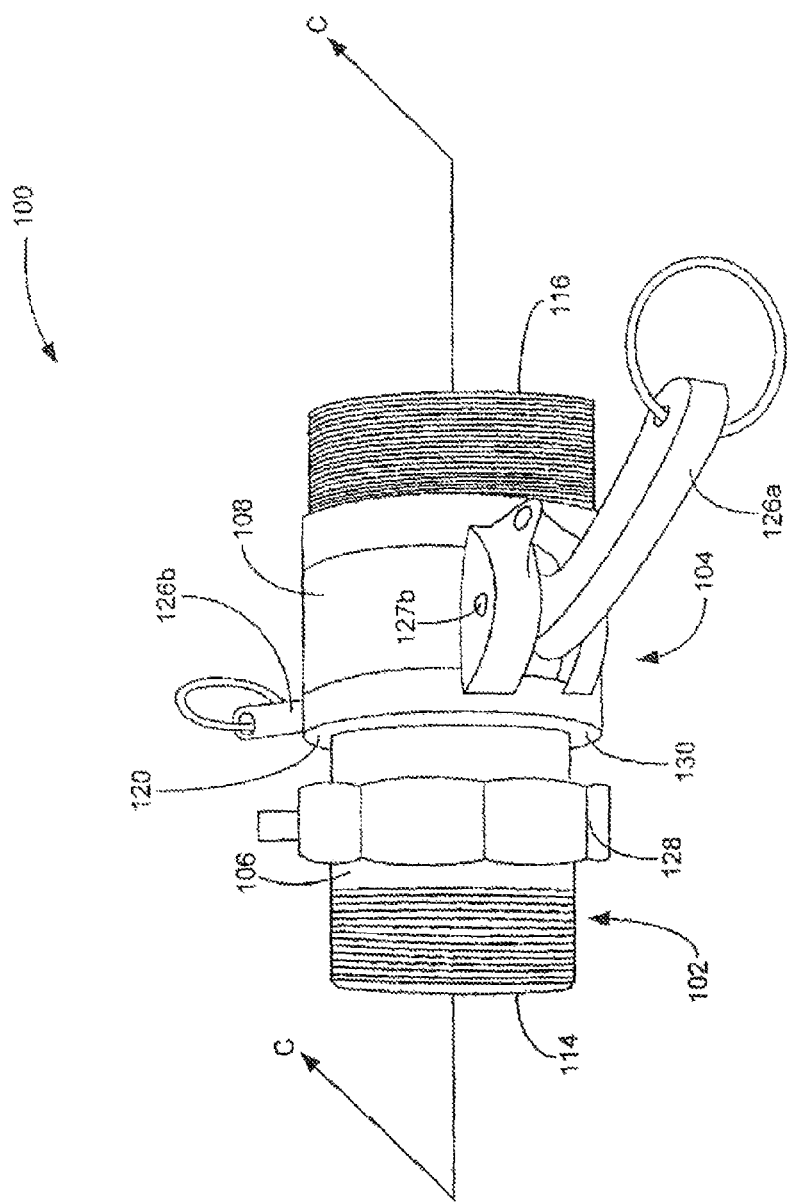
FIG. 1B is perspective illustration of the cam-and-groove coupler of FIG. 1A, showing the male piece inserted into the female piece, and the levers positioned such that the male piece and the female piece are unsecured.
Figure 1C:
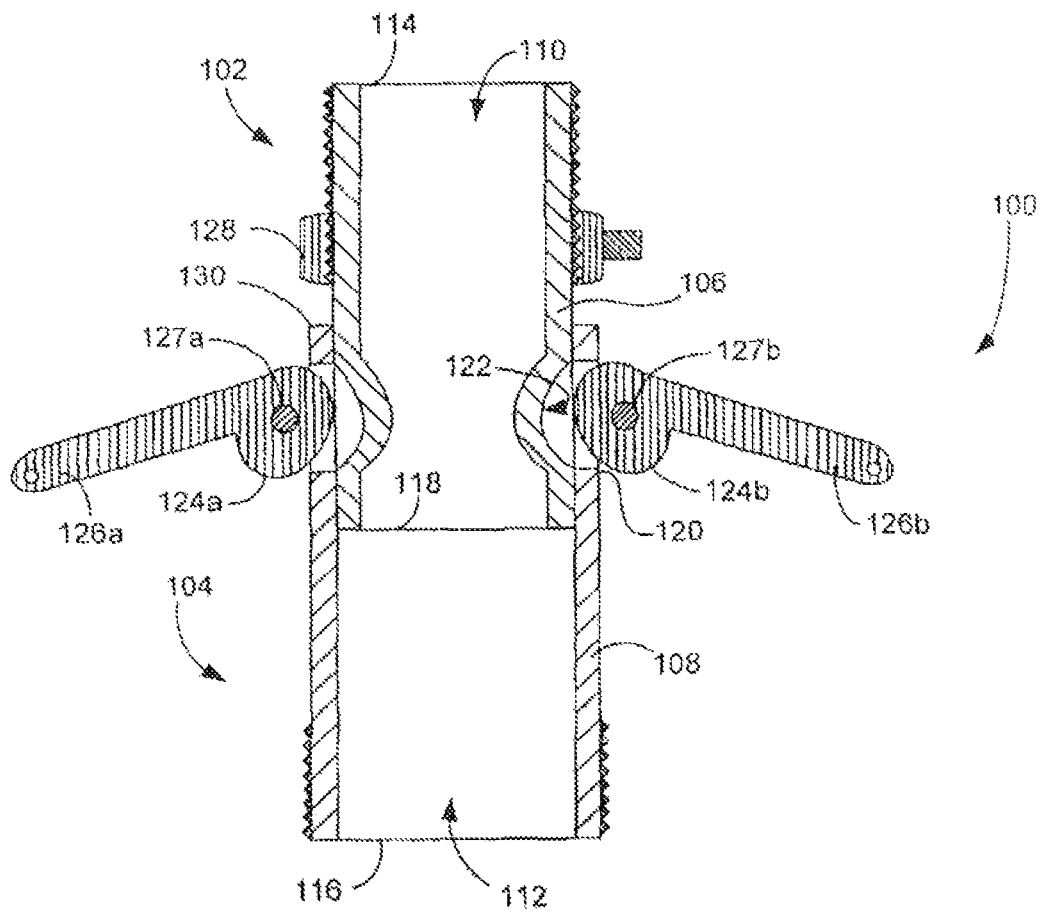
FIG. 1C is a cross section taken along line C-C in FIG. 1B.
Figure 1D:
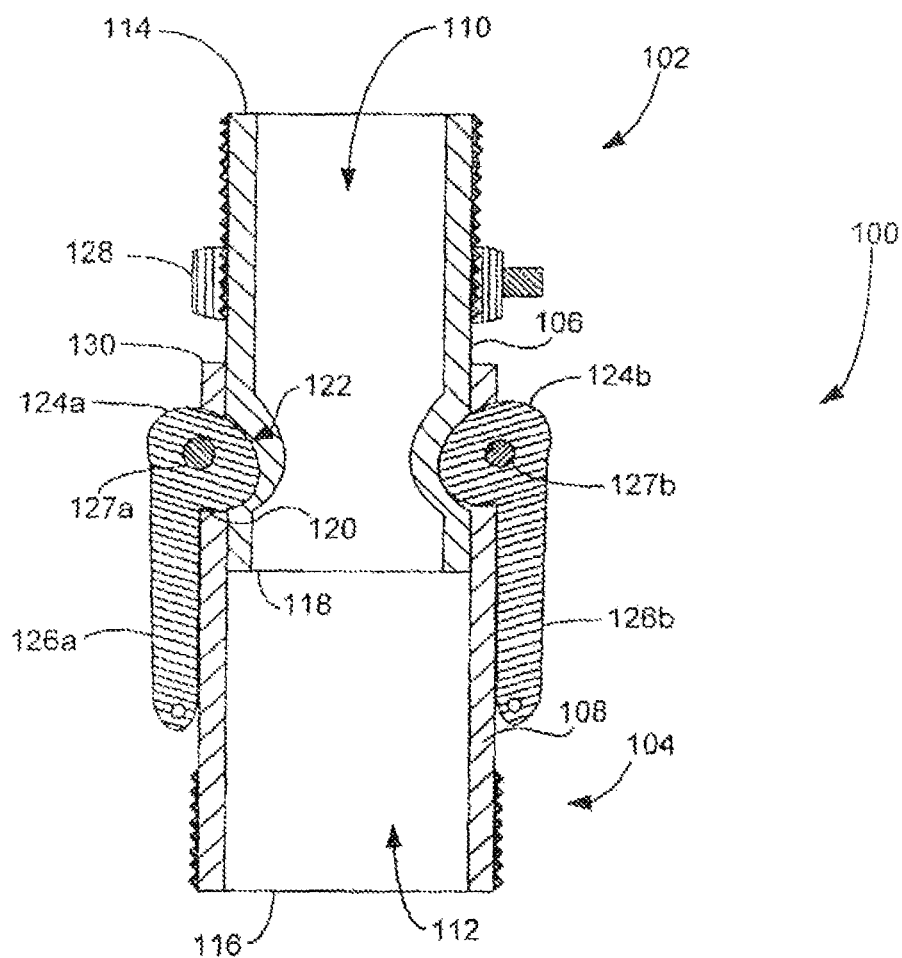
FIG. 1D shows the cross section of FIG. 1C, with the levers positioned such that the male piece and the female piece are secured.
Figure 2A:
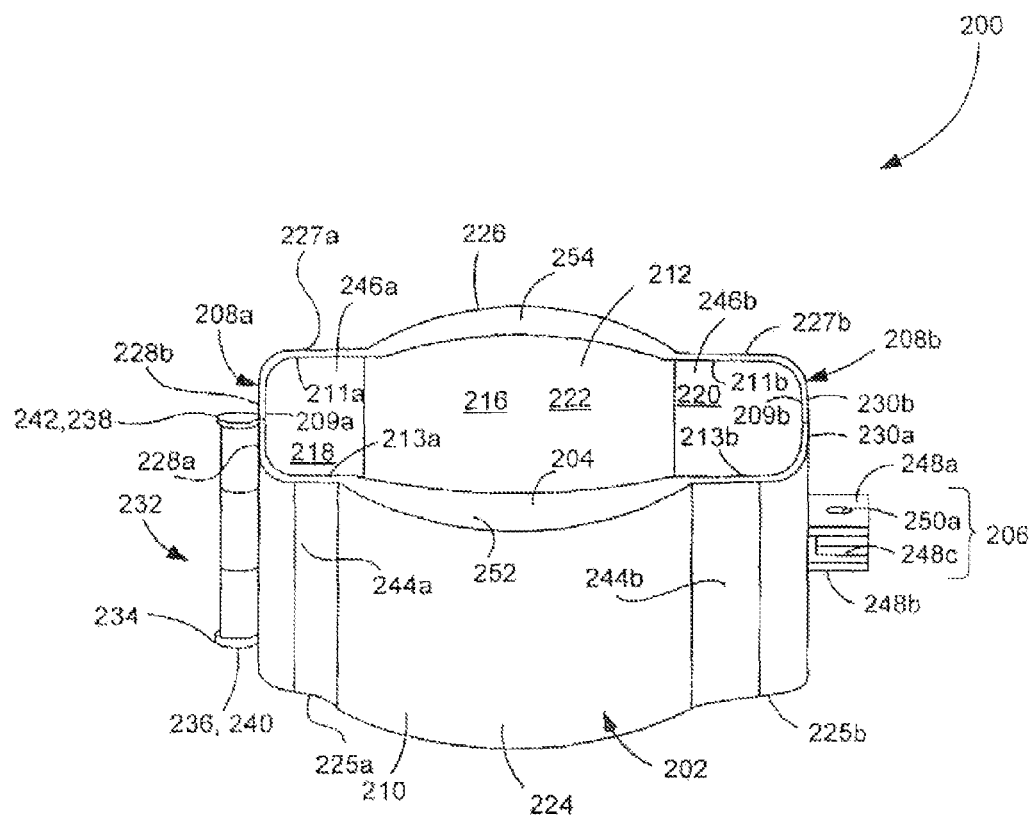
FIG. 2A is a perspective illustration of a lock for a cam-and-groove coupler in accordance with the present invention, showing the lock in a closed configuration.
Figure 2B:
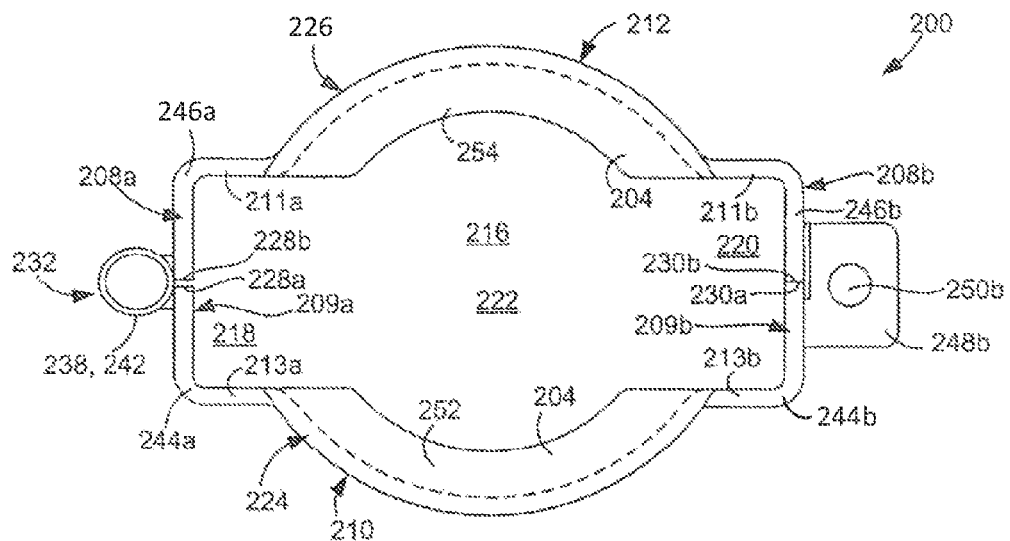
FIG. 2B is a side plan view of the lock of FIG. 2A.
Figure 2C:
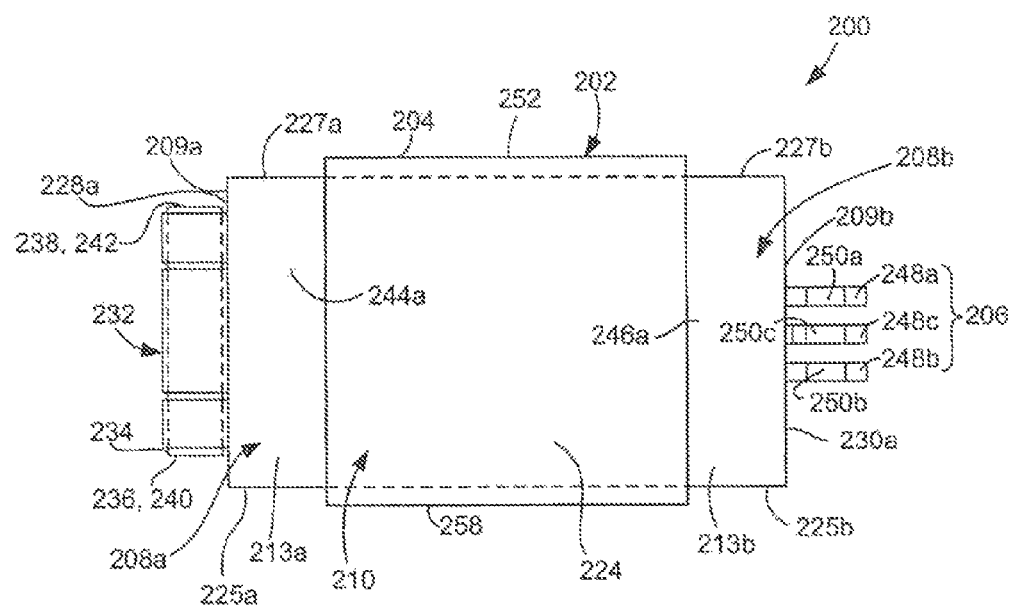
FIG. 2C is a top plan view of the lock of FIG. 2A.

Referring to FIGS. 2A-2C, an embodiment of a lock 200 for a cam and-groove coupler 100 is shown. In the embodiments shown and described herein, the lock 200 is described with reference to cam-and-groove coupler 100 as described hereinabove; however, it will be appreciated that lock 200 may be used with various configurations of cam-and-groove couplers, and the lock is not limited to use with cam-and-groove coupler 100.

The lock 200 generally comprises a collar member 202, and at least one projection 204 extending inwardly from the collar member. In the embodiments shown, the lock further comprises at least one securing member 206 coupled to the collar member.

Figure 3A:
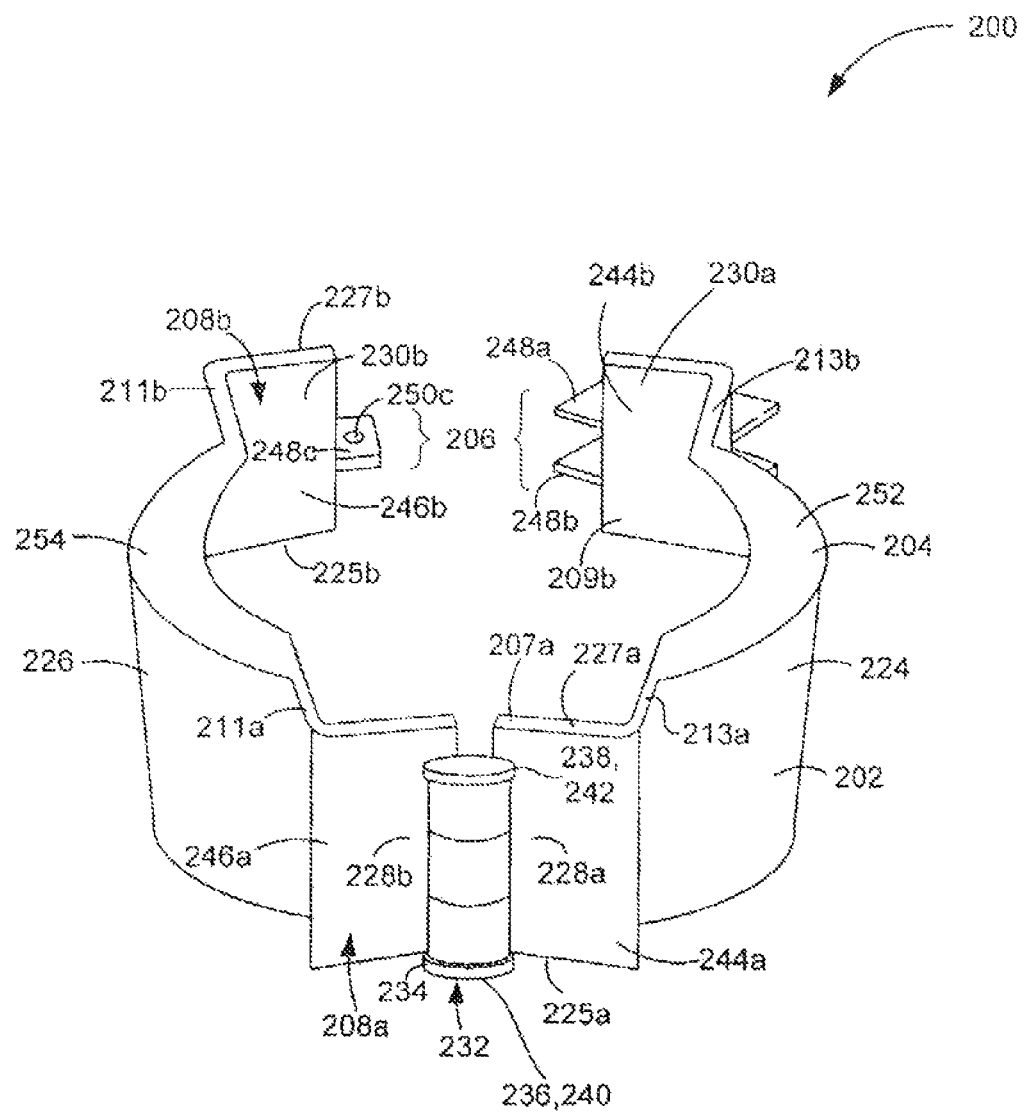
FIG. 3A is a perspective illustration of the lock of FIG. 2A, showing the lock in an open configuration.
Figure 3B:
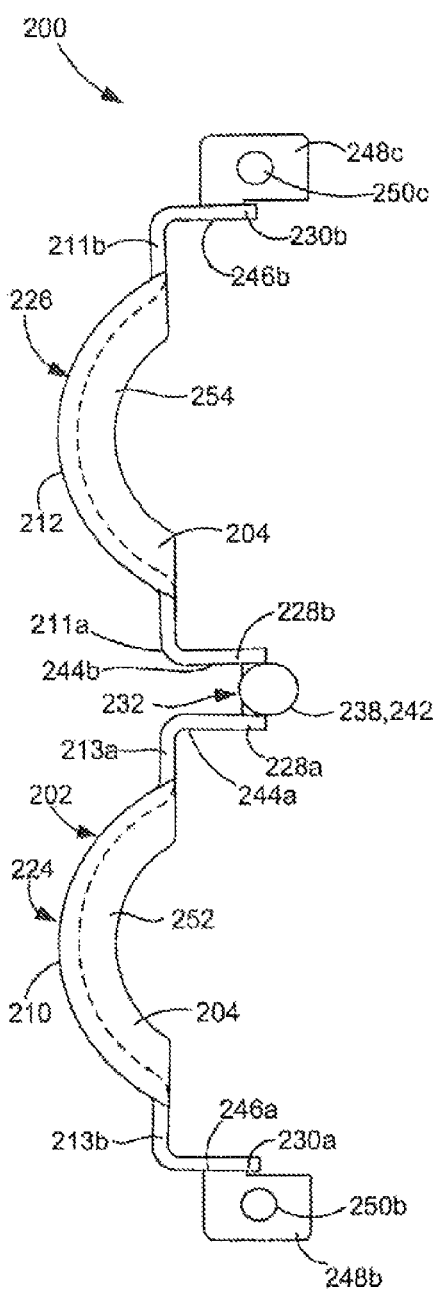
FIG. 3B is a side plan view of the lock of FIG. 3A.
Figure 3C:
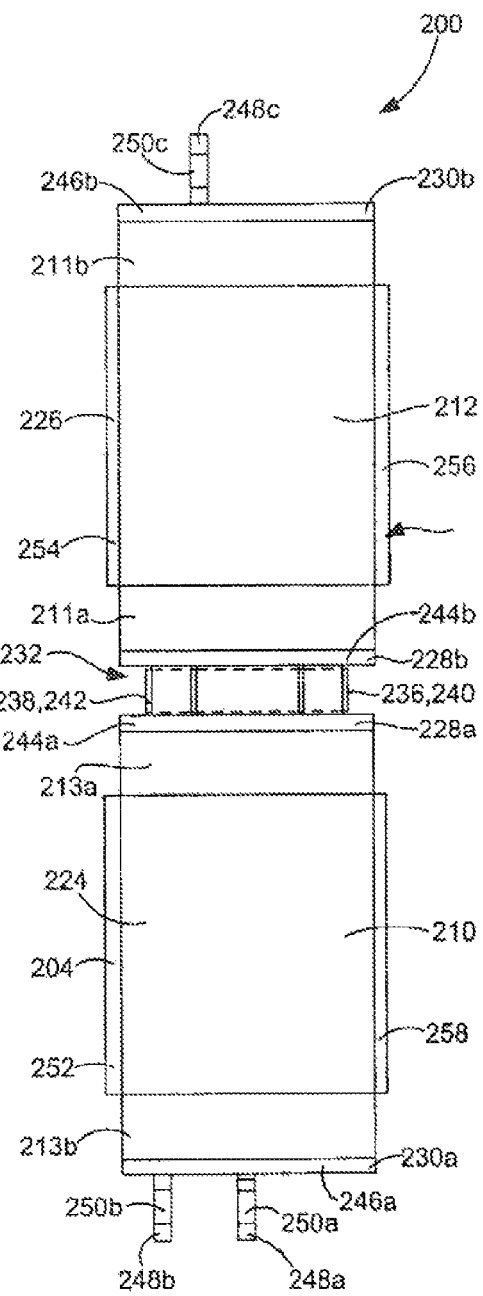
FIG. 3C is a top plan view of the lock of FIG. 3A.
Figure 4A:
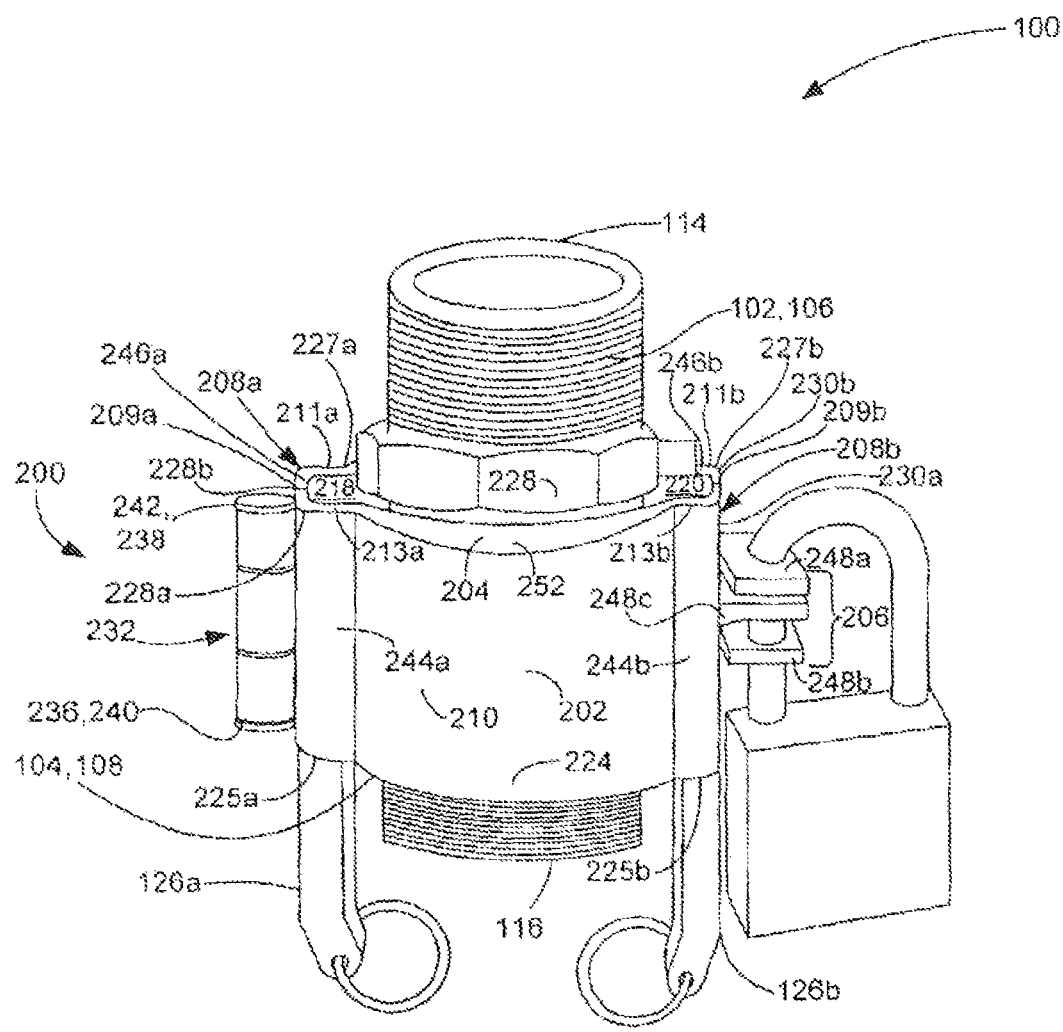
FIG. 4A is a perspective illustration of a lock for a cam and groove coupler of FIG. 3A, wherein the lock is positioned around a cam-and-groove coupler.

The collar member 202 is positionable around a cam-and-groove coupler. In the embodiment shown, collar member 202 is movable between a closed configuration, shown in FIGS. 2A-2C and an open configuration, shown in FIGS. 3A-3C such that the collar member may be positioned around the cam-and-groove coupler, as shown in FIG. 4A. In alternate embodiments, the lock 200 may not have an open and a closed configuration. For example, the lock 200 may only have a closed configuration, and may be positioned around the cam-and-groove coupler by sliding on the cam-and-groove coupler.

Referring to FIGS. 2A and 2C, the collar member 202 comprises a plurality of wall portions. That is, the collar member comprises at least first 208a and second 208b wall portions. In the embodiment shown, the first wall portion 208a and the second wall portion 208b each comprise a central wall 209a, 209b, and first 211a, 211b and second 213a, 213b transverse walls extending from the central walls 209a, 209b. In alternate embodiments, the first 208a and second 208b wall portions may be otherwise configured. For example the first 208a and second 208b wall portions may each comprise only a single generally flat wall, or a single generally rounded wall.

In the embodiment shown, the collar member further comprises third 210 and fourth 212 wall portions, which are generally rounded and extend between the first 208a and second 208b wall portions. The first 208a, second 208b, third 210, and fourth 212 wall portions are generally configured such that when the collar member 202 is positioned around the cam-and-groove coupler 100 and in the closed position, the first 208a, second 208b, third 210, and fourth 212 wall portions define a lumen 216 in which the cam-and-groove coupler is positioned, and the collar member 202 generally surrounds the circumference of the cam-and-groove-coupler 100.

In the embodiment shown, the wall portions are each distinct from each other, and meet at defined corners. However, in alternate embodiments, the wall portions may not be distinct from each other. For example, the collar member 202 may be generally ovular in shape.

In the embodiment shown, the collar member 202 comprises four wall portions. In alternate embodiments, the collar member may comprise an alternate number of wall portions, for example only two wall portions, or greater than four wall portions. Furthermore, in the embodiment shown, the wall portions are generally solid, and the lumen 216 is circumferentially closed. However, in alternate embodiments, the one or more of the wall portions may comprise openings, for example for viewing a portion of the cam-and-groove coupler 100, and accordingly the lumen may not be circumferentially closed.

Referring still to FIGS. 2A and 2B, in the embodiment shown, the lumen 216 comprises first 218, second 220, and third 222 lumen portions. The first 218 and second 220 lumen portions project from opposed sides of the third lumen portion 222. The first lumen portion 218 is defined by the first wall portion, and is generally sized to receive the first lever arm 126a of the cam-and-groove-coupler 100. That is, when the collar member 202 is positioned around the cam-and-groove coupler 100 and in the closed configuration, at least a portion of the first lever arm 126a fits within the first lumen portion 218. The second lumen portion 220 is defined by the second wall portion 208b, and is generally sized to receive the second lever arm 126b of the cam-and-groove coupler 100. That is, when the collar member 202 is positioned around the cam-and-groove coupler 100 and in the closed configuration, at least a portion of the second lever arm 126b fits within the second lumen portion 220. The third lumen portion 222 is defined by the third 210 and fourth 212 wall portions, which extend between the first 208a and second 208b wall portions, and is generally sized to receive the body portions 106, 108 of the cam-and-groove coupler 100.

In the embodiment shown, the lumen portions are distinct from each other. That is, as mentioned hereinabove, the wall portions meet at defined corners to define distinct lumen portions. In alternate embodiments, the lumen portions may not be distinct. That is, the wall portions may meet at smoothed junctions. Furthermore, in other embodiments, the lumen may comprise only a single portion. For example, the lumen may be circular or ovular in shape.

Figure 4B:
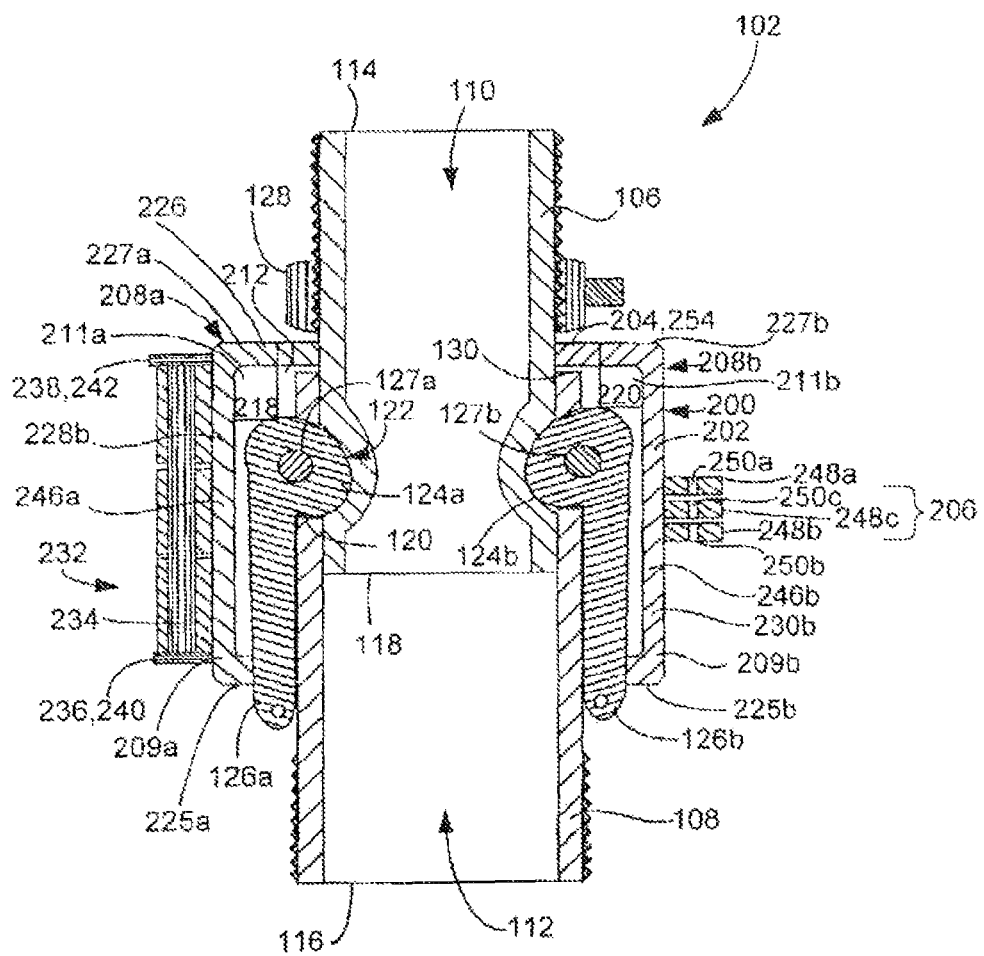
FIG. 4B is a cross section taken along line B-B in FIG. 4A.

Referring to FIGS. 4A and 4B, the first 208*a* and second 208*b* wall portions of the collar 202 are configured to prevent movement of the first 126*a* and second 126*b* lever arms, respectively, to the unsecured position when the collar member is positioned around the cam-and-groove coupler and when the first 126*a* and second 126*b* lever arms are in the secured position. That is, the first 208*a* and second 208*b* wall portions prevent releasing of the male 102 and female 104 pieces of the cam-and-groove coupler, either accidentally, or by tampering.

In the embodiment shown, the first 208*a* and second 208*b* wall portions are each positionable adjacent the first and second lever arms of the cam-and-groove coupler when the collar member 202 is positioned around the cam-and-groove coupler. That is, when the first lever arm is received in the first lumen portion, the first wall portion is adjacent the first lever arm, and when the second lever arm is received in the second lumen portion, the second portion is adjacent the second lever arm. Specifically, in the embodiment shown, the central walls 209*a*, 209*b* of the first 208*a* and second 208*b* wall portions are positionable such that they generally extend along an outer surface of the first 126*a* and second 126*b* lever arms, respectively, and the first 211*a*, 211*b* and second 213*a*, 213*b* transverse walls are positionable such that they extend along the sides of the first 126*a* and second 126*b* lever arms, respectively.

When the collar member 202 is positioned around the coupler 100 and in the closed position, if a user attempts to rotate the first and second lever arms to release the cam-and-groove coupler, or if the first and second lever arms are accidentally moved, the first and second lever arms will contact the first 208*a* and second 208*b* wall portions, and will be prevented from any further rotation. Accordingly, the first and second wall portions prevent the cam-and-groove coupler from being released or from being moved to the unsecured position.

In the embodiment shown, the first 208*a* and second 208*b* wall portions are further configured to prevent access to the pivot pins 127*a*, 127 of the lever arms 126*a*, 126*b*, when the collar member 202 is in the closed position around the coupler 100 and the lever arms are in the secured position. That is, the first 208*a* and second 208*b* wall portions each have first 225*a*, 225*b*, and second 227*a*, 227 opposed ends. The first 208*a* and second 208*b* wall portions are configured such that when the collar member 202 is positioned around the coupler 100 and the lever arms 126*a*, 126*b* are in the secured position, the first pivot pin 127*a* is positioned between the first 225*a* and second 227*a* ends of the first wall portion 208*a*, and the second pivot pin 127*b* is positioned between the first 225*b* and second 227*b* ends of the second wall portion 208*b*. Accordingly, the pivot pins 127*a*, 127*b* are generally positioned within the first 218 and second 220 lumen portions, respectively. Such a configuration may prevent or discourage an unauthorized user from accessing the cam-and-groove coupler by tampering with the pivot pins.

As mentioned hereinabove, in the embodiment shown, the collar member is movable between an closed configuration, shown in FIGS. 2A-C and a closed configuration, shown in FIGS. 3A-3C, such that the collar member may be positioned around and removed from the cam-and-groove coupler 100. The collar member 202 may be moveable between the open configuration and the closed configuration in a variety of ways.

In the embodiment shown, the collar member 202 is pivotably movable between the open configuration and the closed configuration. That is, the wall portions are defined by first 224 and second 226 wall members. The wall members 224, 226 each have first 228*a*, 228*b*, and second 230*a*, 230*b* ends. The wall members are pivotally connected at the first ends 228*a*, 228*b*, thereof, such that the second ends 230*a*, 230*b* thereof may move away from each other to open the collar member 202, and towards each other to close the collar member 202.

In the embodiment shown, the first 224 and second 226 wall members are pivotally connected by a hinge 232, which comprises a hinge pin 234. The hinge pin 234 comprises a first end 236 and a second end 238 opposed from the first end. In the embodiment shown, the first 236 and second 238 ends each comprise a flange 240, 242, which prevents removal of the hinge pin 234 from the hinge 232. The flange 240 at the first end may be formed when the hinge pin 234 is manufactured. The flange 242 at the second end 238 may be formed after the hinge pin 234 is inserted into the hinge 232, for example by hammering the end of the hinge pin 234. Such a configuration may prevent the cam-and-groove coupler 100 from being tampered with. For example, such a configuration may prevent or discourage an unauthorized user from attempting to remove the hinge pin from the hinge to open the collar member and access the cam-and-groove fastener.

In the embodiment shown, the first wall member 224 comprises a first half 244*a* of the first wall portion 208*a*, a first half 244*b* of the second wall portion, and all of the third wall portion 210; and the second wall member 226 comprises a second half 246*a* of the first wall portion 208*a*, a second half 246*b* of the second wall portion 208*b*, and all of the fourth wall portion 212. Accordingly, the first 208*a* and second 208*b* wall portions are each separable into halves when the collar member 202 is in the open configuration.

In alternate embodiments, the first 224 and second 226 wall members may be otherwise configured. For example the first wall member 224 may comprise all of the first wall portion 208*a*, half of the third wall portion 210, and half of the fourth wall portion 212; and the second wall member 226 may comprise all of the second wall portion 208*b*, half of the third wall portion 210, and half of the fourth wall portion 212. Accordingly, the third 210 and fourth 212 wall portions may be separable into halves when the collar member 202 is in the open configuration. In further alternate embodiments, the wall members 224, 226 may be configured such that some or all of the wall portions are separable into other fractions, such as quarters, or thirds.

In yet further alternate embodiments, the collar member 202 may be movable from an open position to a closed position in another manner. For example, first 224 and second 226 wall members may be completely detachable from each other, rather than pivotably attached. Alternately, the collar member 202 may comprise an alternate number of wall members, for example three wall members, which are movable to define an open configuration and a closed configuration.

As mentioned hereinabove, in the embodiment shown, the lock further comprises at least one securing member 206 coupled to the collar member 202. The at least one securing member 206 is configured to releasably secure the collar 202 member around the cam-and-groove coupler 100.

In the embodiment shown, the at least one securing member 206 is configured to lockably releasably secure the collar member around the cam-and-groove coupler. Referring to FIGS. 2A-4A, the at least one securing member comprises a first 248*a* and a second 248*b* tab extending from the second end 230*a* of the first wall member 224, and a third tab 248*c* extending from the second end 230*b* of the second wall member 226. The first 248*a*, second 248*b*, and third 248*c* tabs each comprise an aperture 250a, 250b, 250c, which are alignable when the collar member 202 is positioned around the cam-and-groove fastener. The apertures 250 are configured to receive a locking fastener, such as a padlock, such that the second ends 230a, 230b of the wall members 224, 226 may be lockably releasably secured together. Such embodiments are useful in preventing the cam-and-groove fastener from being accessed by an unauthorized user.

In the embodiment shown, the at least one securing member 206 is configured to secure the collar member 202 around the coupler 100 with the aid of an additional member such as locking fastener. That is, the at least one securing member 206 is not independently useable. However, in alternate embodiments, the at least one securing member 206 is optionally independently useable, and may not require an additional member.

In further alternate embodiments, the at least one securing member 206 is configured to releasably secure the collar member around the cam-and-groove coupler 202 without being locked. For example, the at least one securing member 206 optionally comprises magnetic members positioned at the second ends 230 of the first 224 and second 226 wall members, which magnetically secure the second ends 230 of the wall members together.

In the embodiments shown, the at least one securing member 206 comprises a plurality of tabs 248 positioned at the second ends 230 of the first 224 and second 226 wall members. In alternate embodiments, the at least one securing member 206 may be otherwise positioned, or the lock 200 may comprise more than one securing member 206 at more than one position. For example, in embodiments wherein the first 224 and second 226 wall members are completely detachable from each other, the lock 200 may comprise at least one securing member at the first ends 228 of the wall members, and a second securing member at the second ends 230 of the wall members.

In alternate embodiments (not shown), wherein the lock 200 is not movable from an open position to a closed position, and rather, is positioned around the cam-and-groove coupler 100 by sliding on and off of the cam-and-groove coupler 100, a securing member 106 may not be provided.

As mentioned hereinabove, the lock 200 further comprises at least one projection 204 extending inwardly from the collar member 202. The projection 204 is configured to engage the cam-and-groove coupler to prevent longitudinal movement of the collar member 202 when the collar member 202 is positioned around that cam-and-groove coupler. That is, the projection 204 serves to prevent the collar member from sliding off of the cam-and-groove coupler, either towards the male end of the cam-and-groove coupler, or the female end of the cam-and-groove coupler.

In the embodiment shown, the male piece 102 of the cam-and-groove coupler 100 comprises a rib 128 extending around the circumference thereof. When the second end 118 of the male piece 102 is inserted into the female piece, the rib 128 is adjacent a lip 130 at the second end of the female piece 104.

In the embodiment shown, the at least one projection 204 comprises a first flange 252, which extends inwardly from an edge of the third wall portion 210, and a second flange 254, which extends inwardly from an edge of the fourth wall portion 212. The flanges 252, 254, are configured such that when the collar member 202 is positioned around the cam-and-groove coupler 100, the flanges 252, 254 extend between the rib 128 of the male piece 102 of the cam-and-groove coupler 100 and the lip 130 of the female end 104 of the cam-and-groove coupler 100. Accordingly, if force is applied to move the lock 200 toward the male piece 102 of the cam-and-groove coupler 100, the flanges 252, 254 will engage and contact the rib 128, and any further movement of the lock 200 will be prevented. Further, if force is applied to move the lock 200 towards the female end 104 of the cam-and-groove coupler 100, the flanges 252, 254 will engage or contact the lip 130, and any further movement of the lock 200 will be prevented.

In alternate embodiments, the at least one projection 204 may be otherwise configured. For example, the at least one projection 204 may comprise a single inwardly extending member, or more than two inwardly extending members. Further, the at least one projection 204 may extend from another portion of the collar member 202, for example an edge of first wall portion 208a or the second wall portion 208b, or a middle region of any of the wall portions. Further, the at least one projection 204 may engage the cam-and-groove coupler in another manner, for example the at least one projection may engage the threads of the cam-and-groove coupler.

In further alternate embodiments (not shown), the at least one projection 204 may be moveable from an un-engaged position, wherein the projection 204 does not extend inwardly to engage the cam-and-groove coupler 100, to an engaged position, wherein the projection 204 does extend inwardly to engage the cam-and-groove coupler 100. For example, the projection 204 may be pivotably movable from the un-engaged position to the engaged position. Further, the projection 204 may be lockable in the engaged position. Such a configuration may be useful in embodiments wherein the lock 200 is not movable from an open position to a closed position, and rather, is positioned around the cam-and-groove coupler 100 by sliding on and off of the cam-and-groove coupler 100. That is, the lock 200 may be slid onto the cam-and-groove coupler 100 with the projection in the un-engaged position, and when the lock is in position on the cam-and-groove coupler, the projection may be moved to the engaged position.

In the embodiment shown, the opposed edges of the third 210 and fourth 212 wall portions additionally comprise projections, 256, 258, which are identical to flanges 252 and 254. This allows the lock to be used in different orientations, without having to align the edge having the projection with the rib 128 and lip 130. That is, in some embodiments, wherein the lock 200 is positioned at a first orientation, flanges 252 and 254 may serve as the projections 204, and in other embodiments, wherein the lock 200 is positioned at a second orientation 180° from the first orientation, flanges 256 and 258 may serve as the projections 204.

Lock 200 may be fabricated in a variety of ways, including, for example, casting, bending, stamping, injection molding, extrusion, rotational moulding, and vacuum forming. In the embodiment shown, each of the parts of lock 200 are integrally formed. However, in alternate embodiments, some or all of the parts may be separately formed. Furthermore, lock 200 may be made from a variety of materials, such as aluminum, steel, titanium, other metals or alloys, or plastics.

Lock 200 may be of a variety of sizes, and may be made to fit around various existing cam-and-groove couplers. For example, lock 200 may be made to fit around a 1.5" cam-and-groove coupler. In such an embodiment, the third lumen portion 222 may generally have a diameter D1 of 2.75", and the first 218 and second 220 lumen portions may be about 1.375" in width W, and 2.125" in length L. Further, the collar member 202 may be about 0.025" in depth D2, and each of the flanges 252, 254 may be about 0.5" in width W2.

It will be appreciated that certain features, which are, for clarity, described in the context of separate embodiments or separate aspects, may also be provided in combination in a single embodiment. Conversely, various features, which are, for brevity, described in the context of a single embodiment or aspect, may also be provided separately or in any suitable sub-combination.

Although the invention has been described in conjunction with specific embodiments thereof, if is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

The invention claimed is:

1. A lock for a cam-and-groove coupler, the cam and groove coupler comprising a male piece insertable into a female piece, the female piece comprising a first lever arm connected to a first cam and a second lever arm connected to a second cam, the first and second lever arms each having a secured position wherein the lever arm is positioned to extend along a body of the female piece to position the cam coupled thereto in a groove on the male piece when the male piece is inserted into the female piece, and an unsecured position wherein the cam does not engage the groove on the male piece when the male piece is inserted into the female piece, the lock comprising:
   a) a collar member positionable around the cam-and-groove coupler and being movable between an open configuration and a closed configuration;
   b) the collar member comprising at least first, second, third, and fourth wall portions, the wall portions defining a lumen when the collar member is in the closed configuration;
   c) the lumen comprising:
      i) a first portion sized to receive the first lever arm of the cam and groove coupler;
      ii) a second portion sized to receive the second lever arm of the cam-and-groove coupler; and
      iii) a third portion sized to receive the body portion of the cam-and-groove-coupler,
   wherein the first portion, second portion, and third portion are distinct and meet at corners;
   d) the first and second wall portions being configured to prevent releasing of the first and second lever arms when the collar member is positioned around the cam-and-groove coupler and in the closed configuration, wherein the first wall portion defines the first lumen portion, the second wall portion defines the second lumen portion, and the third and fourth wall portions extend between the first and second wall portions and define the third lumen portion;
   e) at least one projection extending inwardly from at least one of the first wall portion and the second wall portion to engage the cam-and-groove coupler to prevent the collar member from sliding off of the cam-and-groove coupler when the collar is in the closed configuration and positioned around the cam-and-groove coupler; and
   f) a securing member coupled to the collar member and configured to releasably secure the collar member in the closed configuration;
   wherein the first and second wall portions each comprises a generally planar central wall, and first and second transverse walls extending from the central wall;
   wherein the first wall portion is positioned opposite the second wall portion:
   wherein the third wall portion is positioned opposite the fourth wall portion:
   wherein the collar is split into first and second wall members each having first and second ends, the first and second wall members being pivotably connected at the first ends thereof such that the collar member is movable between an open configuration and a closed configuration;
   wherein the first wall member comprises part of the first wall portion, part of the second wall portion, and the third wall portion, and the second wall member comprises another part of the first wall portion, another part of the second wall portion, and the fourth wall portion.

2. The lock of claim 1, wherein the generally planar central walls have a linear portion.

3. A lock in combination with a cam-and-groove coupler, the cam and groove coupler comprising a male piece inserted into a female piece, the female piece comprising a first lever arm connected to a first cam and a second lever arm connected to a second cam, the first and second lever arms each in a secured position wherein the lever arm is positioned to extend along a body of the female piece to position the cam coupled thereto in a groove on the male piece, and the first and second lever arms movable to an unsecured position wherein the cam does not engage the groove on the male piece when the male piece is inserted into the female piece, the lock comprising:
   a) a collar member positioned around the cam-and-groove coupler;
   b) the collar member comprising at least first, second, third, and fourth wall portions, the wall portions being distinct and meeting at corners, the first wall portion positioned adjacent the first lever arm of the cam-and-groove coupler to prevent movement of the first lever arm to the unsecured position, and the second wall portion positioned adjacent the second lever arm of the cam-and-groove coupler to prevent movement of the second lever arm to the unsecured position, and the third and fourth wail portions each extending between the first and second wall portions; and
   c) at least one projection extending inwardly from the collar member and engaging the cam-and-groove coupler to prevent the collar member from sliding off of the cam-and-groove coupler, the at least one projection extending from at least one of the first wall portion and the second wall portion;
   wherein the first and second wall portions each comprises a generally planar central wall, and first and second transverse walls extending from the central wall;
   wherein the first wall portion is positioned opposite the second wall portion:
   wherein the third wall portion is positioned opposite the fourth wall portion:
   wherein the collar is split into first and second wall members each having first and second ends, the first and second wall members being pivotably connected at the first ends thereof such that the collar member is movable between an open configuration and a closed configuration;
   wherein the first wall member comprises part of the first wall portion, part of the second wall portion, and the third wall portion, and the second wall member comprises another part of the first wall portion, another part of the second wall portion, and the fourth wall portion.

4. The lock of claim 3, wherein the generally planar central walls have a linear portion.

5. A lock for a cam-and-groove coupler, the cam and groove coupler comprising a male piece insertable into a female piece, the female piece comprising a first lever arm connected to a first cam and a second lever arm connected to a second cam, the first and second lever arms each having a secured position wherein the lever arm is positioned to extend along a body of the female piece to position the cam coupled thereto in a groove on the male piece when the male piece is inserted into the female piece, and an unsecured position wherein the cam does not engage the groove on the male piece when the male piece is inserted into the female piece, the lock comprising:

a) a collar member positionable around the cam-and-groove coupler and being movable between an open configuration and a closed configuration;

b) the collar member comprising a plurality of wall portions, the wall portions defining a lumen when the collar member is in the closed configuration;

c) the lumen comprising:
  i) a first portion sized to receive the first lever arm of the cam and groove coupler;
  ii) a second portion to receive the second lever arm of the cam-and-groove coupler; and
  iii) a third portion to receive the body portions of the cam-and-groove-coupler;
  wherein the first, second, and third portions are distinct and meet at corners, d) the wall portions preventing releasing of the first and second lever arms when the collar member is positioned around the cam-and-groove coupler and in the closed configuration;

e) at least one projection extending inwardly from at least one of the wall portions to engage the cam-and-groove coupler to prevent the collar member from sliding off of the cam-and-groove coupler when the collar is in the closed configuration and positioned around the cam-and-groove coupler; and f) a securing member coupled to the collar member and configured to releasably secure the collar member in the closed configuration;

wherein the first and second wall portions each comprises a generally planar central wall, and first and second transverse walls extending from the central wall;

wherein the first wall portion is positioned opposite the second wall portion:

wherein the third wall portion is positioned opposite the fourth wall portion:

wherein the collar is split into first and second wall members each having first and second ends, the first and second wall members being pivotably connected at the first ends thereof such that the collar member is movable between an open configuration and a closed configuration;

wherein the first wall member comprises part of the first wall portion, part of the second wall portion, and the third wall portion, and the second wall member comprises another part of the first wall portion, another part of the second wall portion, and the fourth wall portion.

6. The lock of claim 5, wherein the generally planar central walls have a linear portion.

7. A lock in combination with a cam-and-groove coupler, the cam and groove coupler comprising a male piece inserted into a female piece, the female piece comprising a first lever arm connected to a first cam and a second lever arm connected to a second cam, the first and second lever arms each in a secured position wherein the lever arm is positioned to extend along a body of the female piece to position the cam coupled thereto in a groove on the male piece, and the first and second lever arms each movable to an unsecured position wherein the cam does not engage the groove on the male piece, the lock comprising:

a) a collar member positioned around the cam-and-groove coupler;

b) the collar member comprising: at least first, second, third, and fourth wall portions, the wall portions being distinct from each other and meeting at corners, the first wall portion being positioned adjacent the first lever arm of the cam-and-groove coupler to prevent movement of the first lever arm to the unsecured position, the second wall portion being positioned adjacent the second lever arm of the cam-and-groove coupler to prevent movement of the second lever arm to the unsecured position, and the third and fourth wall portions each extending between the first and second wall portions;

c) at least one projection extending inwardly from the collar member and engaging the cam-and-groove coupler to prevent the collar member from sliding off of the cam-and-groove coupler, the at least one projection extending from at least one of the first wall portion and the second wall portion; and d) at least one securing member coupled to the collar member and configured to releasably secure the collar member around the cam-and-groove-coupler;

wherein the first and second wall portions each comprises a generally planar central wall, and first and second transverse walls extending from the central wall;

wherein the first wall portion is positioned opposite the second wall portion:

wherein the third wall portion is positioned opposite the fourth wall portion:

wherein the collar is split into first and second wall members each having first and second ends, the first and second wall members being pivotably connected at the first ends thereof such that the collar member is movable between an open configuration and a closed configuration;

wherein the first wall member comprises part of the first wall portion, part of the second wall portion, and the third wall portion, and the second wall member comprises another part of the first wall portion, another part of the second wall portion, and the fourth wall portion.

8. The lock of claim 7, wherein the first wall member comprises a first half of the first wall portion, a first half of the second wall portion, and the third wall portion, and the second wall member comprises a second half of the first wall portion, a second half of the second wall portion, and the fourth wall portion.

9. The lock of claim 7, wherein the first and second wall members are connected via a hinge comprising a hinge pin, the hinge pin having a first end and a second end opposed from the first end, the first end and the second end comprising a flange preventing removal of the hinge pin from the hinge.

10. The lock of claim 7, wherein:
a) the securing member comprises a first tab and a second tab extending from the second end of the first wall member, and a third tab extending from the second end of the second wall member; and
b) the first, second, and third tabs each comprise an aperture, the apertures being alignable to receive a locking fastener.

11. The lock of claim 7, wherein the lock is fabricated from one or more of a metal, a metal alloy, or a plastic.

12. The lock of claim 7, wherein the at least one projection comprises at least one flange extending inwardly from the collar member and being positioned between a rib of the male piece of the cam-and-groove coupler and a lip of the female piece of the cam-and-groove coupler.

13. The lock of claim 7, wherein the first and second wall portions prevent movement of the first and second lever arms to the unsecured position by contacting the first and second lever arms to prevent rotation of the first and second lever arms to the unsecured position.

14. The lock of claim 7, wherein the generally planar central walls have a linear portion.

15. The lock of claim 7, wherein
   a) the first, second, third, and fourth wall portions define a lumen; and
   b) the lumen comprises
      i) a first portion receiving the first lever arm of the cam and groove coupler;
      ii) a second portion receiving the second lever arm of the cam-and-groove coupler; and
      iii) a third portion receiving body portions of the cam-and-groove-coupler.

16. The lock of claim 15, wherein the first and second portions project from opposed sides of the third portion.

17. The lock of claim 15, wherein the first wall portion defines the first lumen portion, the second wall portion defines the second lumen portion, and the third and fourth wall portions define the third lumen portion.

18. The lock of claim 7, wherein
   a) the first wall portion further prevents access to a pivot pin of the first lever arm; and
   b) the second wall portion further prevents access to a pivot pin of the second lever arm.

19. The lock of claim 18, wherein
   a) the pivot pin of the first lever arm is positioned between a first end and a second end of the first wall portion; and
   b) the pivot pin of the second lever arm is positioned between a first end and a second end of the second wall portion.

* * * * *

UNITED STATES PATENT AND TRADEMARK OFFICE
CERTIFICATE OF CORRECTION

| | | |
|---|---|---|
| PATENT NO. | : 8,632,103 B2 | Page 1 of 1 |
| APPLICATION NO. | : 12/745740 | |
| DATED | : January 21, 2014 | |
| INVENTOR(S) | : Fahie et al. | |

It is certified that error appears in the above-identified patent and that said Letters Patent is hereby corrected as shown below:

In the Claims

Column 11, line 67, Claim 1 delete "second wall portion:" and insert -- second wall portion; --

Column 12, line 2, Claim 1 delete "fourth wall portion:" and insert -- fourth wall portion; --

Column 12, line 38, Claim 3 delete "wail portions each extending between the first and sec-" and insert -- wall portions each extending between the first and sec --

Column 12, line 50, Claim 3 delete "second wall portion:" and insert -- second wall portion; --

Column 12, line 52, Claim 3 delete "fourth wall portion:" and insert -- fourth wall portion; --

Column 13, line 19, Claim 5 delete "i) a first portion sized to receive the first lever arm of the" and insert -- i) a first portion to receive the first lever arm of the --

Column 13, line 44, Claim 5 delete "second wall portion:" and insert -- second wall portion; --

Column 13, line 46, Claim 5 delete "fourth wall portion:" and insert -- fourth wall portion; --

Column 14, line 30, Claim 7 delete "second wall portion:" and insert -- second wall portion; --

Column 14, line 32, Claim 7 delete "fourth wall portion:" and insert -- fourth wall portion; --

Signed and Sealed this
Twenty-sixth Day of August, 2014

Michelle K. Lee
*Deputy Director of the United States Patent and Trademark Office*

UNITED STATES PATENT AND TRADEMARK OFFICE
CERTIFICATE OF CORRECTION

PATENT NO.         : 8,632,103 B2                                                            Page 1 of 1
APPLICATION NO. : 12/745740
DATED                  : January 21, 2014
INVENTOR(S)       : Fahie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 225 days.

Signed and Sealed this
Twenty-second Day of September, 2015

Michelle K. Lee
*Director of the United States Patent and Trademark Office*